United States Patent [19]

Pearch et al.

[11] Patent Number: 4,694,946

[45] Date of Patent: Sep. 22, 1987

[54] CLUTCH ASSEMBLY FOR A DIESEL ENGINE BLOWER

[75] Inventors: Dean A. Pearch, Mt. Pleasant; Thomas F. Pung, Weidman, both of Mich.

[73] Assignee: Dana Corporation, Toledo, Ohio

[21] Appl. No.: 777,713

[22] Filed: Sep. 19, 1985

[51] Int. Cl.$^4$ ............................................. F16D 25/00
[52] U.S. Cl. .............................. 192/85 AA; 192/91 A; 192/70.27
[58] Field of Search ............. 192/85 AA, 91 A, 89 B, 192/70.27, 70.28; 188/72.4, 366, 367

[56] References Cited

U.S. PATENT DOCUMENTS

| | | | |
|---|---|---|---|
| 2,543,252 | 2/1951 | Nabstedt et al. | 192/91 A |
| 2,575,765 | 11/1951 | Nabstedt et al. | 192/91 A |
| 2,593,521 | 4/1952 | Ball | 192/55 |
| 2,642,844 | 6/1953 | Flinn | 91/422 |
| 2,698,676 | 1/1955 | Eason | 188/170 |
| 2,966,237 | 12/1960 | Galleher | 188/72.3 |
| 3,217,851 | 11/1965 | Mogk et al. | 192/85 AA |
| 3,224,537 | 12/1965 | Hilpert | 192/85 AA |
| 3,362,481 | 1/1968 | Steinhagen | 192/85 AA |
| 3,421,608 | 1/1969 | Van Gorder | 192/85 AA |
| 3,497,046 | 2/1970 | Schilling | 192/85 CA |
| 3,720,296 | 3/1973 | Ohno | 192/3.52 |
| 3,760,916 | 9/1973 | Hanks et al. | 192/67 R |
| 3,804,219 | 4/1974 | Cummings, III | 192/82 T |
| 3,893,556 | 7/1975 | Lech, Jr. et al. | 192/91 A |
| 3,915,433 | 10/1975 | Therkildsen | 254/187 R |
| 3,946,837 | 3/1976 | Houser | 188/72.4 |
| 3,972,269 | 8/1976 | Stauble et al. | 92/84 |
| 4,355,710 | 10/1982 | Schilling | 192/91 A |
| 4,425,993 | 1/1984 | Schilling | 192/85 A |
| 4,425,994 | 1/1984 | Schele | 192/85 AA |
| 4,450,944 | 5/1984 | Fujioka et al. | 192/70.12 |
| 4,460,079 | 7/1984 | Hanks | 192/85 A |
| 4,573,561 | 3/1986 | Deem et al. | 192/91 A |

Primary Examiner—John E. Murtagh
Assistant Examiner—Andrew Joseph Rudy
Attorney, Agent, or Firm—MacMillan & Sobanski

[57] ABSTRACT

The present invention relates to a clutch assembly for selectively coupling a supercharging blower or other driven device to a mechanical output of a prime mover, such as a diesel engine. The clutch assembly includes an input member which is preferably flexibly coupled to a rotatable blower drive gear member connected to the engine. The input member is journalled about a centrally disposed hub. An output shaft is secured to the hub and carries power to the driven device. The input member includes a plurality of longitudinally oriented slots which receive radially extending lugs formed on a first plurality of disc pack clutch plates. A second plurality of clutch plates or separators is interleaved with the first plurality of clutch plates to form a friction disc pack clutch. The second plurality of clutch plates includes centrally disposed splines which engage complementarily sized splines formed on the hub. A radially extending piston plate is formed integral with the hub. The piston plate is axially aligned with the disc pack. An axially slidable cylinder surrounds the hub and the piston plate and includes a radially inwardly extending plate positioned between the piston plate and disc pack. A wave spring is disposed between the piston plate and the cylinder plate. The wave spring biases the slidable cylinder plate toward the disc pack, thereby compressing the first and second pluralities of clutch plates of the disc pack together so as to couple the input member to the hub and, therefore, the output shaft. An end disc is secured to the slidable cylinder which, in conjunction with the cylinder, the piston plate, and the hub, defines an annular chamber. Injection of a fluid under pressure, such as compressed air, into the chamber slides the cylinder axially away from the disc pack clutch against the urging of the wave spring, thereby disengaging the output shaft from the input member. Upon relaxation of the fluid pressure, the wave spring re-compresses the disc pack and re-couples the output shaft to the input members.

14 Claims, 3 Drawing Figures

CLUTCH ASSEMBLY FOR A DIESEL ENGINE BLOWER

BACKGROUND OF THE INVENTION

The present invention relates generally to clutches and more specifically to a fluid operated clutch assembly having a plurality of interleaved clutch plates, commonly referred to as a disc pack, for use with diesel engine blowers and the like.

Two-cycle diesel engines are commonly utilized in trucks and other vehicles. Diesel engines of this type normally require pressurized air during start-up and under normal operating conditions. As a result, a supercharging blower is usually provided to generate and supply a predetermined level of pressurized air to the engine. Additionally, a turbocharger is also often provided to further increase the level of pressurized air supplied to the engine. In the past, the blower has been driven by a direct connection to a mechanical output of the engine, such as a gear train connected to a crankshaft of the engine, while the turbocharger has been driven by exhaust gases from the engine. Accordingly, both of these devices have been continuously operated while the engine is running. However, it has been found that it is undesirable to operate both the blower and the turbocharger under certain operating conditions of the engine, operating conditions in which the turbocharger alone is the more efficient means of supplying pressurized air to the engine. The factors which contribute to these operating conditions include the load on the engine, the position of the throttle, the level of smoke and other emissions from the engine, and the like. Therefore, it would be desirable to provide a clutch assembly for selectively connecting the blower to the mechanical output of the engine. Such a clutch assembly would preferably be compact, have low parasitic drag, and have a normally engaged configuration such that activation by a motive medium disengages the clutch. Failure of the motive medium or other mechanisms in the clutch would therefore maintain engagement between the blower and the mechanical output of the engine.

SUMMARY OF THE INVENTION

The present invention relates to a clutch assembly for selectively coupling a supercharging blower or other driven device to a mechanical output of a prime mover, such as a diesel engine. The clutch assembly includes an input member which is preferably flexibly coupled to a rotatable blower drive gear connected to the engine. The input member is journalled about a centrally disposed hub. An output shaft is secured to the hub and carries power to the driven device. The input member includes a plurality of longitudinally oriented slots which receive radially extending lugs formed on a first plurality of disc pack clutch plates. A second plurality of clutch plates or separators is interleaved with the first plurality of clutch plates to form a friction disc pack clutch. The second plurality of clutch plates includes centrally disposed splines which engage complementarily sized splines formed on the hub. A radially extending piston plate is formed integral with the hub. The piston plate is axially aligned with the disc pack. An axially slidable cylinder surrounds the hub and the piston plate and includes a radially inwardly extending plate positioned between the piston plate and disc pack. A wave spring is disposed between the piston plate and the cylinder plate. The wave spring biases the slidable cylinder plate toward the disc pack, thereby compressing the first and second pluralities of clutch plates of the disc pack together so as to couple the input member to the hub and, therefore, the output shaft. An end disc is secured to the slidable cylinder which, in conjunction with the cylinder, the piston plate, and a hub, defines an annular chamber. Injection of a fluid under pressure, such as compressed air, into the chamber slides the cylinder axially away from the disc pack clutch against the urging of the wave spring, thereby disengaging the output shaft from the input member. Upon relaxation of the fluid pressure, the wave spring re-compresses the disc pack and re-couples the output shaft to the input members.

It is an object of the present invention to provide an improved clutch assembly for selectively coupling a supercharging blower or other driven device to a mechanical output of a diesel engine.

It is another object of the present invention to provide such a clutch assembly which will be disengaged when a pressurized fluid is supplied thereto and will be engaged when the pressurized fluid is removed.

It is a further object of the present invention to provide such a clutch assembly which is compact, serviceable, and inexpensive in construction.

Other objects and advantages of the present invention will become apparent to those skilled in the art from the following detailed description of the preferred embodiment, when read in light of the accompanying drawings.

DESCRIPTION OF THE PREFERRED EMBODIMENT

Figure 1:
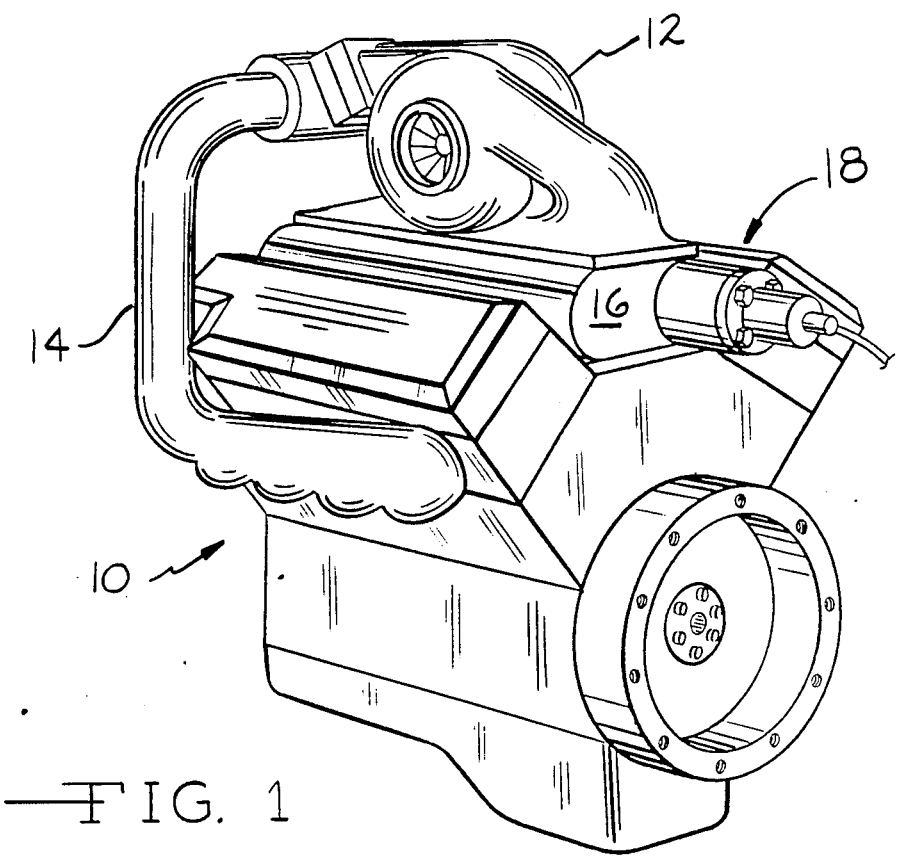
FIG. 1 is a perspective view, somewhat schematic, of a conventional diesel engine having a clutch assembly according to the present invention mounted thereon.

Referring now to FIG. 1, a conventional diesel engine is schematically illustrated generally at 10. The engine 10 includes a conventional turbocharger 12. The turbocharger 12 is continuously driven by exhaust gases provided from the engine 10 through a duct 14. The outlet from the turbocharger 12 is connected to a conventional blower 16 secured to the engine 10. As will be explained in greater detail below, the blower 16 is mechanically driven by the engine 10. A clutch assembly according to the present invention is illustrated generally at 18. The clutch assembly 18 is provided to selectively connect the blower 16 to the engine 10 for operation. Inasmuch as the engine 10, the turbocharger 12, and the blower 16 are conventional in the art, they will not be further described.

Figure 2:
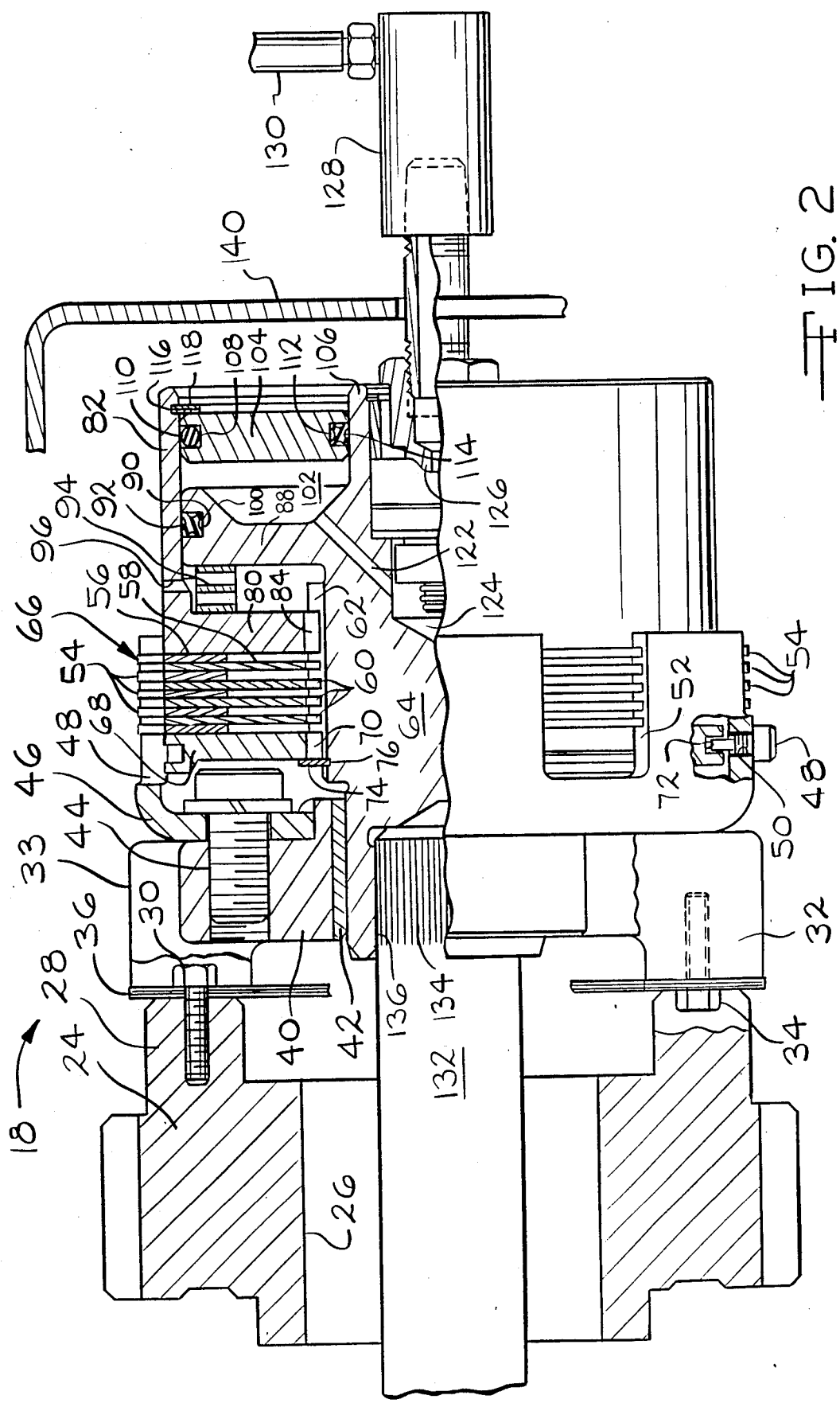
FIG. 2 is a view in half section of a clutch assembly according to the present invention.

Referring now to FIG. 2, the clutch assembly 18 is connected to a drive means in the engine 10, such as a conventional blower drive gear 24 having a central longitudinal passageway 26 formed therein. The blower drive gear 24 is directly connected to the engine 10 for continuous rotation therewith. A plurality, typically three, of equiangularly spaced lugs 28 (only one of which is illustrated in FIG. 2) are formed on the blower drive gear 24. The lugs 28 are adapted to receive a corresponding plurality of threaded fasteners, such as bolts 30. A similar plurality of equiangularly spaced lugs 32 formed on an input member 33 are disposed in facing and alternating relationship with the lugs 28. A like number of threaded fasteners 34 are alternately and oppositely disposed relative to the fasteners 30 and are adapted to be received by the lugs 32. The lugs 28 and 32 and the fasteners 30 and 34 collectively secure a flexible disc coupling 36 and the input member 33 to the drive gear 24. The flexible disc coupling 36 comprises a plurality of thin stainless steel plates which rotatably interconnect the drive gear 24 and the input member 33, while providing sufficient flex to accommodate misalignment of the components.

The input member 33 includes a centrally disposed aperture 40 which frictionally and securely receives a journal bearing sleeve 42 therein. The journal sleeve 42 is preferably fabricated of a self-lubricating bearing material, such as PTE-lead, and may be of a design like or similar to the type DU manufactured by Garlock Bearings, Inc. The input member 33 is secured by a plurality of threaded fasteners 44 to a cylindrical drive cup 46. A plurality of radially inwardly directed threaded pins 48 (only one of which is illustrated) are received in complementarily threaded radial apertures 50 formed in the drive cup 46. The pins 48 fix the axial position of the drive cup 46 relative to other components of the clutch assembly 18, as will be more fully described below.

The drive cup 46 includes a plurality of open-ended, longitudinally extending slots 52. The slots 52 receive and rotatably secure therein a plurality of radially extending ears or tabs 54 of a first plurality of clutch plates 56. A second plurality of clutch plates 58, commonly referred to as separator plates, are interleaved with the first plurality of clutch plates 56 and include inwardly directed female splines 60 which are engaged by complementarily sized and disposed male splines 62 formed about the axially medial portion of a central disposed hub 64. The first plurality of clutch plates 56 and the second plurality of clutch plates 58 comprise a conventional disc pack type clutch assembly, indicated generally at 66, as those skilled in the clutch art will readily appreciate.

Adjacent the end of the clutch pack assembly 66 near the input member 33, a circular stop plate 68 is provided. The stop plate 68 includes a centrally disposed aperture having a plurality of female splines 70 formed therein. The splines 70 are complementary to the male splines 62 formed on the hub 64. Thus, the stop plate 68 rotates with the hub 64. A groove 72 formed in the periphery of the stop plate 68 receives the ends of the pins 48 and retains the drive cup 46 axially relative to the stop plate 68. A circular snap ring 74 seats within a complementarily sized groove 76 formed in the hub 64 so as to limit axial motion of the plate 68 in a direction away from the clutch pack assembly 66 (toward the left when viewing FIG. 2). The plate 68 thus acts as a stop against which the various plates of the clutch pack assembly 66 may be compressed.

Adjacent the opposite end of the clutch pack assembly 66, a radially extending plate 80 is provided. The plate 80 is formed integral with an axially slidable cylinder 82. The outside diameter of the cylinder 82 is slightly smaller than the inside diameter of the drive cup 46. Accordingly, the cylinder 82 can axially slide within the drive cup 46 to permit the cylinder plate 80 to engage and compress the first and second pluralities of plates 56 and 58 of the clutch pack assembly 66. The cylinder plate 80 of the cylinder 82 includes a central aperture having female splines 84 which are complementary to and engage the male splines 62 formed on the hub 64. Accordingly, the cylinder 82 rotates with the hub 64. The hub 64 also includes a integral radially extending piston plate 88. The piston plate 88 is disposed in a plane which is parallel to the plane of the cylinder plate 80. The piston plate 88 has a circumferential groove 90 formed about its periphery. The groove 90 of the piston plate 88 receives a sealing ring, such as a quad ring 92 or similar sealing device, to seal the periphery of the piston plate 88 about the inside surface of the cylinder 82. Thus, it will be appreciated that cylinder 82 is axially slidable about the hub 64 and the piston plate 88 formed thereon.

Figure 3:
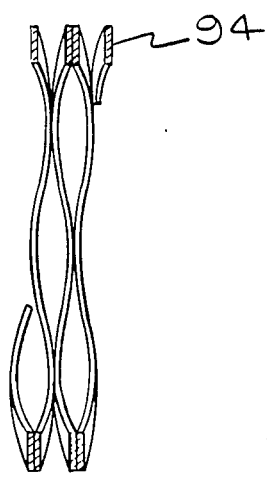
FIG. 3 is a sectional elevational view of the wave spring of the clutch assembly according to the present invention.

Disposed in the cavity between the cylinder plate 80 and the piston plate 88 is a crest-to-crest wave spring 94. The wave spring is more fully illustrated in FIG. 3. Basically, the wave spring 94 includes multiple turns, the waves of which are arranged with crests abutting crests, i.e., out of phase. The wave spring 94 functions to bias the cylinder 82, and more particularly the radially extending cylinder plate 80 formed thereon, axially away from the piston plate 88 and toward the disc pack assembly 66, thereby compressing it and frictionally coupling the the hub 64 to the drive cup 48. A vent passageway 96 formed in the wall of the cylinder 82 maintains the cavity containing the wave spring 94 at atmospheric pressure.

The face of the piston plate 88 opposite the wave spring 94 has an annular recess 100 formed thereon, which defines a portion of an annular chamber 102. The annular chamber 102 is further defined by an annular end disc 104 which is disposed between the cylinder 82 and an axially extended region 106 of the hub 64. A groove 108 is formed about the outer surface of the end disc 104 and receives an O-ring seal 110 therein to seal the end disc 104 within the cylinder 82. Likewise, a groove 112 is formed about the inner surface of the end disc 104 and receives a quad ring seal 114 to seal the end disc 104 about the extended region 106 of the hub 64. A channel 116 is formed in the inner surface of the cylinder 82 which receives a circular snap ring 118 therein. The snap ring 118 axially retains the disc 104 within the cylinder 82.

An obliquely disposed passageway 122 extends from the annular chamber 102 to a centrally disposed chamber 124 within the hub 64. The chamber 124 communicates through a union assembly 126 to a stationary fitting 128 disposed in alignment with and external to the clutch assembly 10. The union 126 is conventional and includes a first portion, which is secured to the hub 64 and rotates therewith, and a second portion, which is secured to the stationary fitting 128. A fluid line 130 may be selectively connected to a source of a pressurized fluid (not illustrated), such as air. An output shaft 132 is lastly provided within the passageway 26. The output shaft 132 is normally provided in the engine 10 as a portion of the direct mechanical connection between the input member 33 and the blower 16 in the prior art. The output shaft 132 has a plurality of serrations 134 formed thereon which are received within a blind aperture 136 concentrically formed in the end of the hub 64 adjacent the input member 33. Thus, the output shaft 132 rotates with the hub 64. The output shaft 132 is connected to the blower 16 or other driven device. A housing 140 may be disposed about the entire clutch.

assembly 18 to prevent contamination by dirt and foreign substances.

In operation, the clutch assembly 18 normally couples the output shaft 132 to the input member 33. This occurs because the wave spring 94 urges the slidable cylinder plate 80 axially away from the stationary piston plate 88 (toward the left when viewing FIG. 2) into abutting engagement with the disc pack 66. Such engagement cause the first and second pluralities of plates 56 and 58 to frictionally engage each other. Consequently, the drive cup 46 (and the input member 33 connected thereto) rotates with the hub 64 (and the output shaft 132 connected thereto). When it is desired to uncouple the output shaft 132 from the input member 33, pressurized fluid is supplied through the fluid line 130, the union 126, and the passageway 122 to the chamber 102. The pressurized fluid in the chamber 102 exerts a force against the cylinder plate 80 which overcomes the urging of the wave spring 94 so as to slide the cylinder plate 80 and the cylinder 82 axially away from the disc pack 66 (toward the right when viewing FIG. 2). As a result, the first and second pluralities of plates 56 and 58 in the disc pack 66 will be released from their frictional engagement, and the hub 64 will be free to rotate relative to the drive cup 46.

The foregoing disclosure is the best mode devised by the inventors for practicing this invention. It is apparent, however, that devices incorporating modifications and variations will be obvious to one skilled in the art of clutches. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A clutch assembly comprising:
    a generally hollow cylindrical driven input member having a co-axial passageway formed therethrough;
    a first plurality of radially inwardly extending clutch plates connected to said input member for rotation therewith;
    a second plurality of radially outwardly extending clutch plates interleaved with said first plurality of clutch plates;
    a rotatable hub connected to said second plurality of clutch plates for rotation therewith, said hub including an annular piston plate disposed thereabout which is axially immovable relative thereto, said hub forming an output member to said clutch assembly;
    a hollow cylinder disposed about said hub and said piston plate and axially movable relative to said hub, said cylinder including a radially inwardly extending cylinder plate disposed between said first and second pluralities of clutch plates and said piston plate;
    means for normally urging said cylinder plate into engagement with said first and second pluralities of clutch plates so as to cause frictional engagement thereof to couple said input member to said hub; and
    means for selectively moving said cylinder plate out of engagement with said first and second pluralities of clutch plates to uncouple said hub from said input member.

2. The invention defined in claim 1 wherein said means for normally urging includes a wave spring disposed between said piston plate and said cylinder plate.

3. The invention defined in claim 2 wherein said means for selectively moving said cylinder plate includes an annular end disc disposed about said hub between said hub and said cylinder, said end plate being axially movable relative to said cylinder, a chamber being defined by said hub, said piston plate, said cylinder, and said end disc.

4. The invention defined in claim 3 further including means for limiting the axial movement of said end plate relative to said cylinder.

5. The invention defined in claim 4 wherein said means for limiting axial movement of said end disc includes a groove formed in the inside surface of said cylinder and a snap ring retained in said groove.

6. The invention defined in claim 4 further including means for selectively providing pressurized fluid to said defined chamber to move said cylinder plate out of engagement with said first and second pluralities of clutch plates.

7. The invention defined in claim 6 wherein said means for selectively providing pressurized fluid includes a central chamber formed in said hub and a passageway providing fluid communication between said central chamber and said defined chamber.

8. A clutch assembly for selectively connecting a supercharging blower to a mechanical output of a diesel engine, said supercharging blower providing pressurized air to said diesel engine when connected to said mechanical output, said clutch assembly comprising:
    a generally hollow cylindrical driven input member having a co-axial passageway formed therethrough;
    a first plurality of radially inwardly extending clutch plates connected to said input member for rotation therewith;
    a second plurality of radially outwardly extending clutch plates interleaved with said first plurality of clutch plates;
    a rotatable hub connected to said second plurality of clutch plates for rotation therewith, said hub including an annular piston plate disposed thereabout which is axially immovable relative thereto, said hub forming an output member to said clutch assembly;
    a hollow cylinder disposed about said hub and said piston plate and axially movable relative to said hub, said cylinder including a radially inwardly extending cylinder plate disposed between said first and second pluralities of clutch plates and said piston plate;
    means for normally urging said cylinder plate into engagement with said first and second pluralities of clutch plates so as to cause frictional engagement thereof to couple said input member to said hub; and
    means for selectively moving said cylinder plate out of engagement with said first and second pluralities of clutch plates to uncouple said hub from said input member.

9. The invention defined in claim 8 wherein said means for normally urging includes a wave spring disposed between said piston plate and said cylinder plate.

10. The invention defined in claim 9 wherein said means for selectively moving said cylinder plate includes an annular end disc disposed about said hub between said hub and said cylinder, said end plate being axially movable relative to said cylinder, a chamber being defined by said hub, said piston plate, said cylinder, and said end disc.

11. The invention defined in claim 10 further including means for limiting the axial movement of said end plate relative to said cylinder.

12. The invention defined in claim 11 wherein said means for limiting axial movement of said end disc includes a groove formed in the inside surface of said cylinder and a snap ring retained in said groove.

13. The invention defined in claim 11 further including means for selectively providing pressurized fluid to said defined chamber to move said cylinder plate out of engagement with said first and second pluralities of clutch plates.

14. The invention defined in claim 13 wherein said means for selectively providing pressurized fluid includes a central chamber formed in said hub and a passageway providing fluid communication between said central chamber and said defined chamber.

* * * * *